United States Patent [19]

Tatsumi

[11] 4,390,242

[45] Jun. 28, 1983

[54] DETACHABLE CAMERA FILTER HOLDER CAPABLE OF BEING CONNECTED IN SERIES WITH A LIKE FILTER HOLDER

[75] Inventor: Kazutsune Tatsumi, Tokyo, Japan

[73] Assignee: Hoya Corporation, Tokyo, Japan

[21] Appl. No.: 243,211

[22] Filed: Mar. 12, 1981

[30] Foreign Application Priority Data

Mar. 26, 1980 [JP] Japan ................................. 55-38710

[51] Int. Cl.³ .............................................. G02B 7/00
[52] U.S. Cl. .................................................... 350/318
[58] Field of Search ........................... 350/318, 316, 58

[56] References Cited

U.S. PATENT DOCUMENTS

3,758,200  9/1973  Saito ..................................... 350/318
4,302,078  11/1981  Stravitz ............................... 350/318

FOREIGN PATENT DOCUMENTS

4246  9/1979  European Pat. Off. ............ 350/318
1203564  1/1960  France ..................................... 350/58
258866  12/1948  Switzerland .......................... 350/58

*Primary Examiner*—Jon W. Henry
*Attorney, Agent, or Firm*—Sughrue, Mion, Zinn, Macpeak and Seas

[57] ABSTRACT

A filter holder in which two or more filter mounts can be used together and in which the filters are rotatably mounted. The filter holder is composed of a holder body having an aperture therein and an adapter ring for mounting the holder body to a camera lens. A plurality of parallel plates are rigidly coupled to the holder body with the plates in the holder body together defining first and second grooves. Leaf springs are provided in the grooves for resiliently supporting end surfaces of filters positioned therein. A cylindrical portion is provided opposite the parallel plates on the rear side of the holder body having a somewhat greater radius than the apertures of the plates and the aperture in the holder body. Claws are provided on the cylindrical portion for resiliently retaining a flange of the adapter ring for rotatably, detachably and attachably mounting the adapter ring to the holder body.

5 Claims, 20 Drawing Figures

DETACHABLE CAMERA FILTER HOLDER CAPABLE OF BEING CONNECTED IN SERIES WITH A LIKE FILTER HOLDER

BACKGROUND OF THE INVENTION

The present invention relates to a filter holder for a camera.

A typical filter for a camera is provided with a circular filter plate on which a frame member having a male screw thread is mounted and is attachable to and detachable from a camera lens through the frame member. Another type of a filter is also commonly used for which a holder is mounted in advance on a camera lens and a rectangular filter plate is attachably and detachably inserted into the holder through a holding thread formed in the holder. The latter type of filter is advantageous in that once a holder is affixed to the front of the camera lens, a variety of types of filters can be used by simply interchanging the frameless filters. However, with conventional filter holders, it is impossible to readily mount the filter holders onto a camera unless a special mount member is provided on the camera or support member. Furthermore, in case a polarizing filter is used, it is necessary to rotate the filter. However, it is impossible to rotate the conventional filter with the latter type of filter holder. In addition, it is impossible to use a camera filter of the usual type together with a hood on the holder.

SUMMARY OF THE INVENTION

The present invention provides a filter holder which overcomes the above noted defects. According to the present invention, there is provided a filter holder which is composed of a holder body having a circular aperture and an adapter ring constructed for mounting to a camera lens. A plurality of plates are disposed at predetermined intervals in the widthwise direction with the plates being arranged along a circular periphery defined by the circular aperture and extending to right and left walls of the front portion of the holder body. A first groove passing through the plates in the up-and-down direction and a second groove having a stop member at a lower portion thereof are provided on the plates and at least one pair of leaf springs are provided for the first and second grooves in the right and left side walls resiliently pushing the end surfaces of the filter or the filter mount inserted into the grooves to thereby hold the filter in position. A cylindrical portion having a somewhat greater diameter than that of the circular aperture is provided at the rear surface of the holder body, and further a plurality of claws for resiliently retaining a flange of the adapter ring are provided on an inner peripheral surface of the cylindrical portion to rotatably and detachably mount the adapter on the filter body.

According to the invention, various interchangable adapters having various diameters are provided which can be mounted on various objective lenses, for example, for lenses having a diameter of 46 to 72 mm and two or more kinds of filters each having different effects can be used. Since the holder body and the adapter ring are rotatably engaged with each other, the holder is suitable for polarizing filters. Also, since the holder body unit is provided with edges, convex portions and annular concave grooves for coupling, holder body units having the same configurations can be connected in a rotatable manner.

As is apparent from the above description, a first object of the present invention is to provide a filter holder which is readily mountable on a conventional camera. A second object of the invention is to provide a filter holder in which the assembly of an adapter ring and a holder body is facilitated and the two members are rotatable with respect to each other. Further, a third object of the invention is to provide a filter holder in which not only a single camera filter or a single filter mount but two or more can be used together. A fourth object of the invention is to provide a filter holder in which the filter is firmly retained by at least one pair of leaf springs disposed in filter insert grooves formed in the inner wall of the holder body which prevent the filter from being disengaged therefrom. A fifth object of the invention is to provide a filter holder in which parts of the filter insert grooves extend up and down the side walls and other parts have stop members whereby either rectangular filters or circular filters can be used effectively. A sixth object of the invention is to provide a filter holder with which a holder body unit can be serially connected to another holder body unit wherein the first is relatively rotatable by the second and both have the same configuration.

These and other objects will be fully understood from the following description with reference to the accompanying drawings.

DESCRIPTION OF THE PREFERRED EMBODIMENTS

Figure 1:
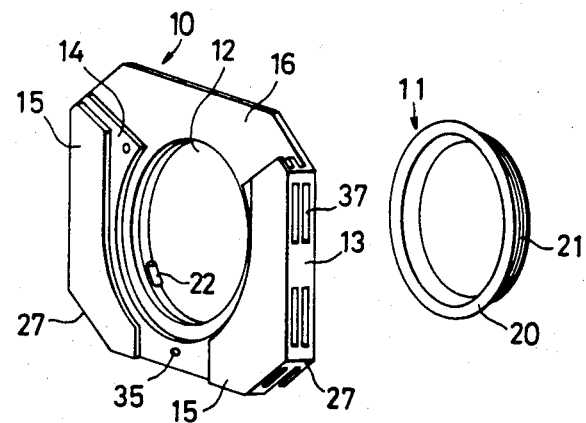
FIG. 1 is an exploded view of a holder body and adapter ring of the invention.
Figure 3:
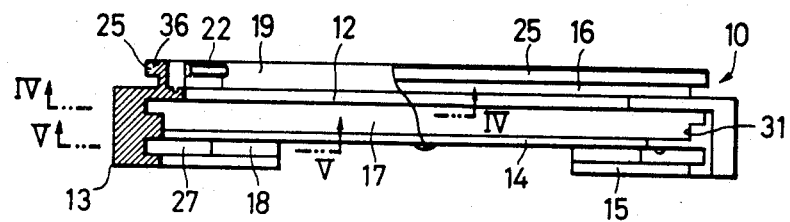
FIG. 3 is partially a cross-sectional view of the left hand portion of the holder body taken along the line I-I of FIG. 2 and partially a plan view of the holder body.
Figure 4:
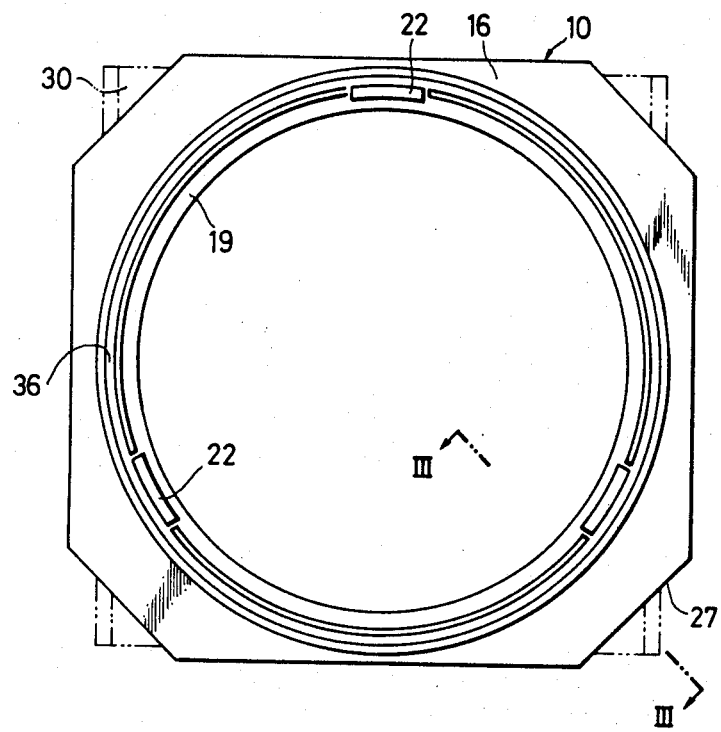
FIG. 4 is a rear view of the holder body from an adapter ring mounting side.
Figure 5:
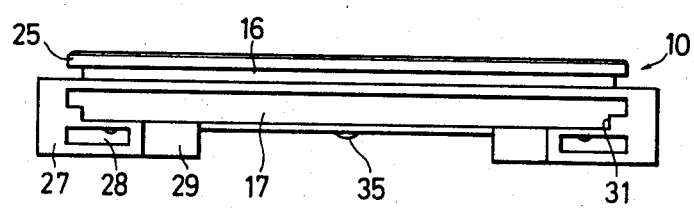
FIG. 5 is a bottom view of FIG. 4.
Figure 6:
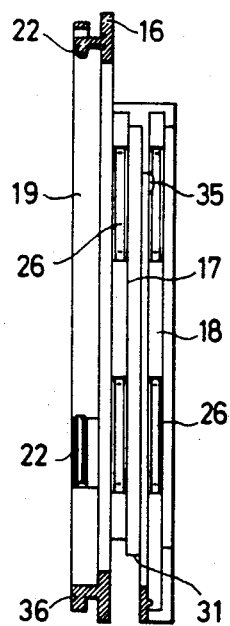
FIG. 6 is a cross-sectional view of the holder body taken along the line II—II of FIG. 2.

A filter holder according to the present invention is, as shown in FIG. 1, composed of a holder body 10 having a plurality of grooves formed therein into which filters or filter mounts can be inserted and an adapter ring 11 for mounting the holder body to the camera. The body 10 is in the form of substantially rectangular shape but each corner thereof is bevelled. A circular aperture 12 is formed in the center of the body 10. The aperture 12 provides an incidental surface or an optical path for the camera. The body 10 includes right and left side walls 13 from which first and second plates 14 and 15 extend inwardly. Between a base 16 and the first plate 14 of the body on each side is defined a first groove 17 for receiving a filter or filter mount while between the first and second plates 14 and 15 a second groove 18 is similarly defined. As shown in FIGS. 3 and 4, a cylindrical portion 19 having a relatively small depth is formed on the rear side of the base 16. A plurality of claws 22 (three in the embodiment described) for engaging and retaining a flange 20 of the adapter ring are formed in the inner periphery of the cylindrical portion.

Figure 2:
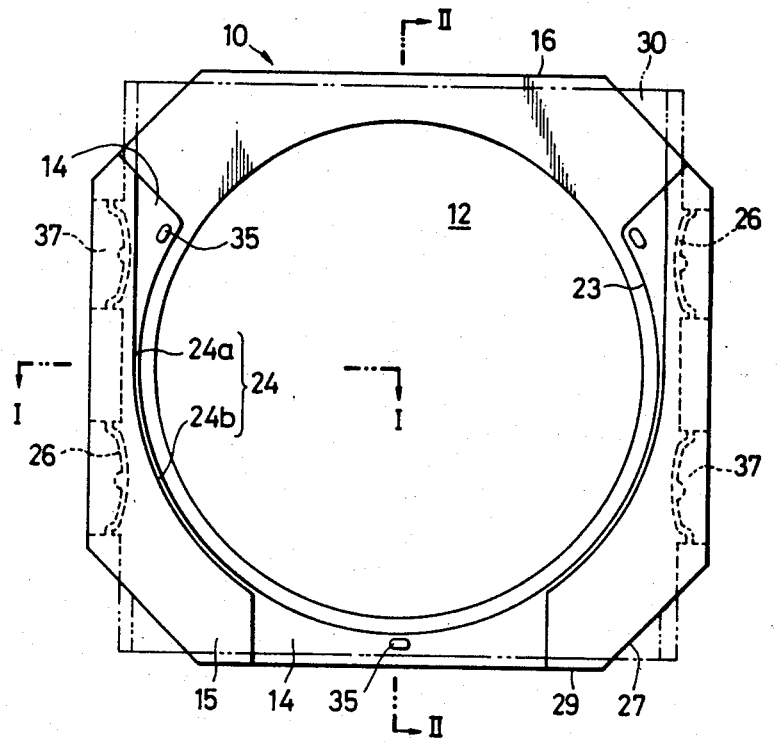
FIG. 2 is a front view of the holder body of FIG. 1.

As shown in FIG. 2, the first plate 14 defines on the front side of the circular aperture a circle from which an upper arc is removed. That is, the first plate has a three-quarter circular arc edge 23 which is concentric with the aperture 12. In contrast, the second plates 15 each have a J-shaped edge 24 and are symmetrically arranged. The second plates are not integral with each other in the middle lower portion. An arcuate portion 24b of each second plate 15 has a radius of curvature so as to engage with an outer flange 25 of the cylindrical portion 19 formed on the rear surface of the base.

Figure 8:
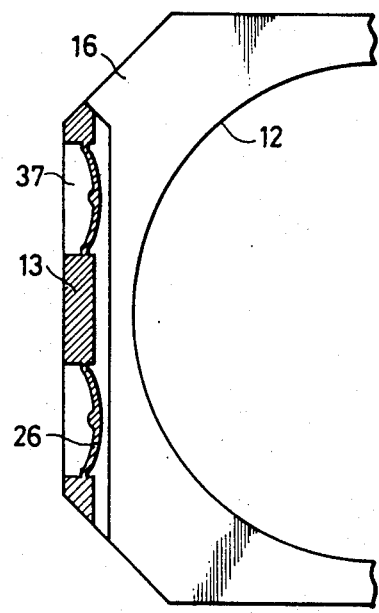
FIG. 8 is a cross-sectional view taken along the line IV—IV of FIG. 3.
Figure 9:
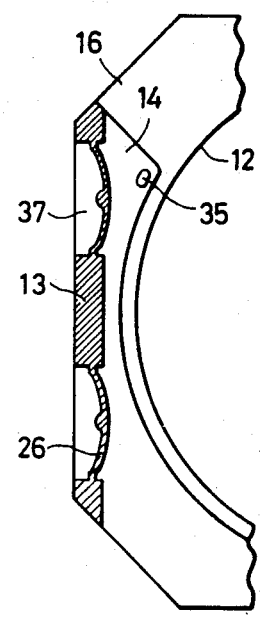
FIG. 9 is a cross-sectional view taken along the line V—V of FIG. 9.
Figure 10:
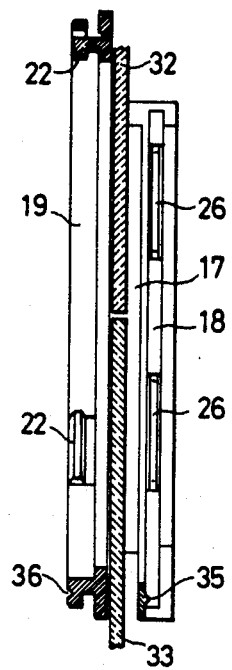
FIG. 10 is a cross-sectional view showing two types of filters used in a single groove.
Figure 17:
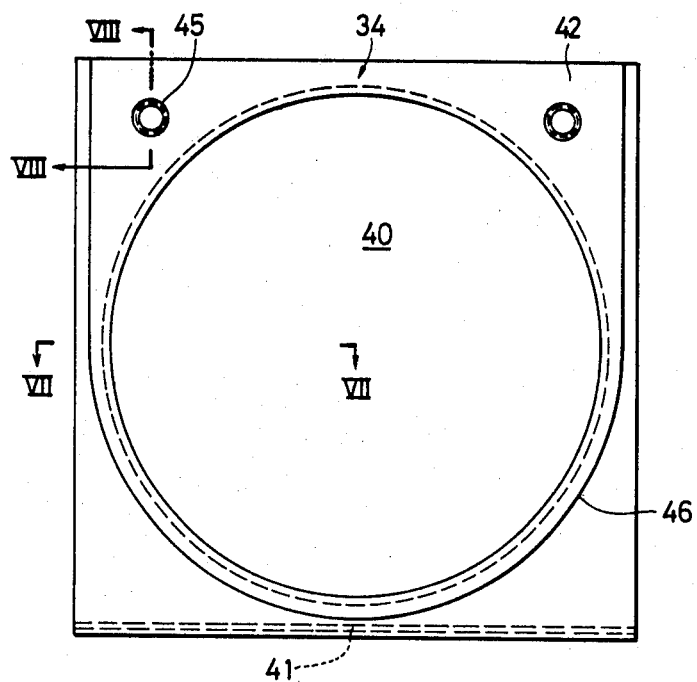
FIG. 17 is a front view of a mount for a circular filter.
Figure 19:
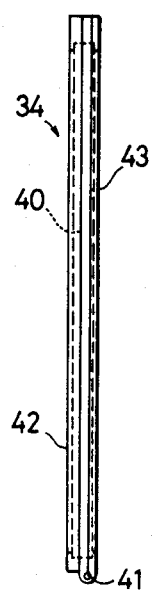
FIG. 19 is a side view of FIG. 17.
Figure 18:
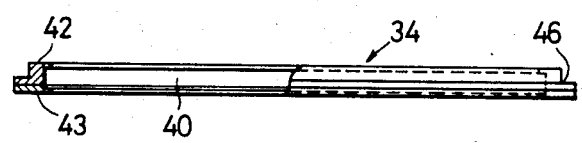
FIG. 18 is a half cross-sectional plan view of a circular filter mount.
Figure 20:
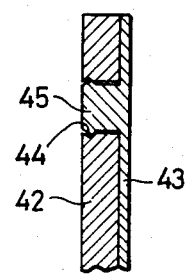
FIG. 20 is a cross-sectional view taken along the line VIII—VIII of FIG. 17.

In the inner surfaces of the first and second grooves 17 and 18, upper and lower leaf springs 26 are disposed each directed to the vertical axis of the base, as shown in FIGS. 2, 8 and 9, so that a filter or filter mount inserted into the grooves is resiliently pushed and held at right and left end surfaces thereof by the leaf springs thereby positively retaining the filter or the filter mount. The second plate 15 has two holes 28 formed therein communicating with a slant surface 27 formed at the lower corner of the side wall. Stop members 29 are provided at the lower bottom portions of the side walls which serve as supports for the insertion of the rectangular filter 30 shown in FIG. 2. The first groove 17 has a greater width than that of the second groove 18 and extends up and down the holder side walls. The first groove 17 is, as best shown in FIG. 3, provided with shouldered portions 31 on both sides thereof. It is thus possible to insert a thin filter utilizing the shoulders and to insert different filters 32 and 33 in upper and lower portions of the aperture 12 as shown in FIG. 10. Also utilizing the total width of the grooves, a filter mount 34 of relatively great thickness as shown in FIG. 17 having associated shoulders can be inserted into the grooves.

A plurality of small projections 35 (three in the embodiment shown in FIG. 7) are formed on the surface of the first plates 14 in the vicinity of the arc edge. In correspondence with the projections 35, annular concave U-shaped grooves 36 are formed in the rear surface of the cylindrical portion 19 formed on the rear side of the base. These projections and the concave grooves cooperate with each other to connect two holder bodies 10 with each other.

Figure 11:
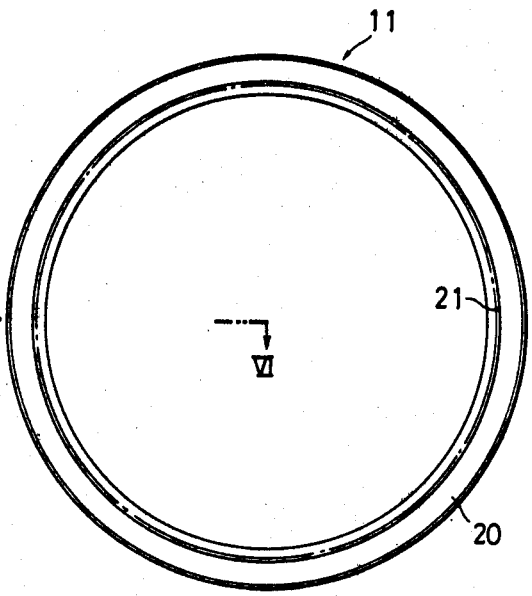
FIG. 11 is a front view of the adapter ring of FIG. 1.
Figure 12:
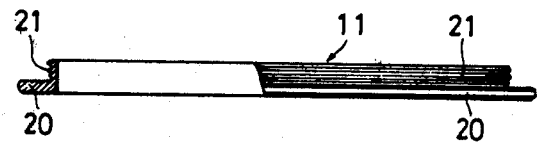
FIG. 12 is a half cross-sectional plan view of the adapter ring.

FIGS. 11 and 12 show the adapter ring 11 in which a male thread 21 is formed in the outer cylindrical surface thereof for coupling to the camera lens. The adapter ring has a perpendicular flange 20 engageable with the claws 22 of the holder body.

Figure 7:
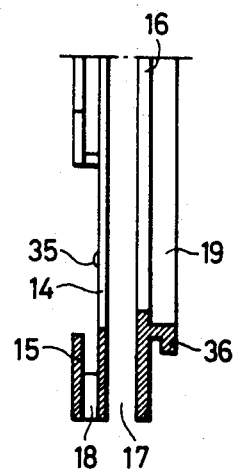
FIG. 7 is a cross-sectional view taken along the line III—III of FIG. 4.
Figure 13:
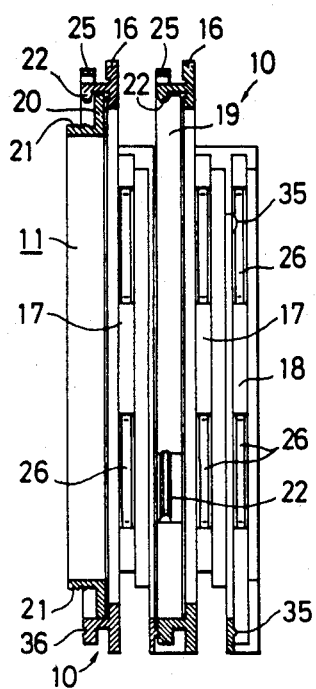
FIG. 13 is a cross-sectional view of two filter holders connected in series.
Figure 15:
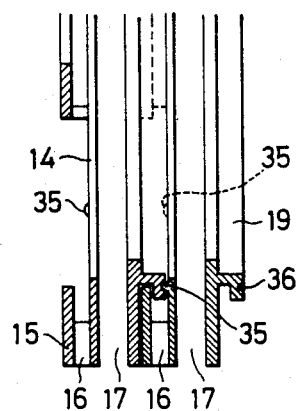
FIG. 15 is a cross-sectional view taken along the line III—III of FIG. 4 with two filter holders connected in series.

FIG. 7 is a cross-sectional view taken along the line III—III of FIG. 4. FIG. 13 is a cross-sectional view showing two holder bodies 10 connected to each other. FIG. 15 is a cross-sectional view taken along the line III—III of FIG. 4 showing the connection between the holder bodies. As shown in FIG. 8, concave portions 37 are formed in the outer surfaces of the right and left side walls 13 corresponding to the positions of the leaf springs 26.

Figure 14:
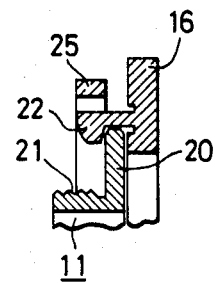
FIG. 14 is a partially enlarged cross-sectional view of the adapter ring.

The filter holder according to the present invention is used as follows. The adapter ring 11 is placed against the cylindrical portion 19 formed on the rear side of the holder body 10 and the flange 20 is pressingly inserted into the cylindrical portion 19. At this time, the end surfaces of the flange 20 are inserted into grooves defined by the claws 22 while the claws 22 are resiliently opened as shown in FIG. 14. After the insertion operation, the inner peripheries of the claws pressingly abut against the flange surface so that the adapter is tightly joined to the holder body thereby preventing disengagement. After mounting the adapter 11, the male thread portion 21 is threadedly engaged with the camera lens mounting thread to thereby mount the holder on the camera. As described above, the filter holder of the preferred embodiment of the invention has first and second grooves 17 and 18. Therefore, a single filter can be inserted into either of the grooves or different filters inserted into the first and second grooves. Since the leaf springs 26 are, as shown in FIGS. 2, 6, 8 and 9, disposed diametrically opposite one another, the filters 30 inserted therein are firmly retained at to thereby prevent them from falling out of the holder. It is to be noted that when the mounting of the adapter ring 11 to the holder body using the cylindrical portion 19 is completed, the two members are rotatable so that the filter holder mounted on the camera is rotatable.

A plate-like filter 30 such as a rectangular plastic filter can be inserted downwardly into either of the grooves 17 and 18 of the holder. Also, a circular filter mount 34 can be inserted downwardly into the first groove. As shown in FIGS. 17 to 20 inclusive, the filter mount 34 is constructed so that a filter 40 is clamped by a front plate 42 and a rear plate 43 coupled with a hinge 41 and an upper concave portion 44 and an upper convex portion 45 are fixedly coupled to each other. The front plate 42 has a U-shaped shoulder 46 as viewed from the front portion and the curvature of the U-shaped shoulder corresponds to the plate of the holder so that the filter mount can be reviewed in the filter holder.

As shown in FIG. 10, different types of filters 32 and 33 can be inserted into the first groove 17 one above the other to thereby provide a particular photographic effect. The upper and lower filters 32 and 33 cannot be moved up and down due to the action of the leaf springs 26.

The use of connected holder bodies will now be described. A plurality of projections 35 are formed on the first plate 14 of the holder body 10 and annular grooves 36 are formed in the cylindrical portion of the base on the rear side. Furthermore, the outer flange 25 of the cylindrical portion is engageable with the arcuate portion 24b of the second plate 15. Therefore, the second groove 18 of the first holder body is engageable with the outer flange 25 of the cylindrical portion of the second holder body while the concave grooves 36 of the second holder body are also engageable with the convex portions 35 of the first holder body whereby the first and second holders can be connected in a rotatable manner as seen in FIGS. 13 and 15. With two holders coupled together, the maximum number of filters which can be used is increased and special photographic effects can be obtained using compound filters. In the embodiment described, connection is achieved at three positions. Three connected holders can be used although there is some possibility that the image field will be reduced. For most practical uses, two connected units are sufficient.

Figure 16:
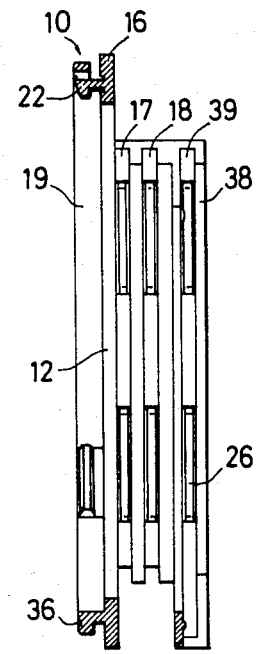
FIG. 16 is a cross-sectional view of a modification of the invention.

FIG. 16 shows a modification wherein, in addition to the above described holder, a third plate 38 is provided so that first, second and third grooves are in total available. It is apparent that three different type filters can be used. Furthermore, the modified filter holder can be used in connection with the above described filter holder having two grooves.

As described above, according to the present invention, various types of filters can be used and smooth rotation is provided.

What is claimed is:

1. A filter holder comprising: a holder body having an aperture therein; an adapter ring for mounting said holder body on a lens of a camera; a plurality of apertured parallel plates rigidly coupled to said holder body, said plates and said holder body defining a first groove extending up and down and a second groove having a stop member at a low portion thereof; right and left side walls coupling said parallel plates to said holder body; leaf springs provided in said first and second grooves for resiliently supporting end surfaces of a filter; a cylindrical portion provided on a rear side surface of said holder body, said cylindrical portion having a greater radius than apertures of said plates; and a plurality of claws for resiliently retaining a flange of said adapter ring at an inner periphery of said cylindrical portion for rotatably, detachably and attachably mounting said adapter ring to said holder body.

2. The filter holder according to claim 1 wherein said cylindrical portion has an outer flange and an outermost plate of said plurality of plates having a circular arc edge engageable with the outer flange of a cylindrical portion of a like holder.

3. The filter holder according to claim 1 wherein a plurality of projections are formed concentrically on a front surface of a first one of said plates which is closest to said holder body, said projections being engageable with a plurality of annular concave grooves formed in a rear surface of said cylindrical portion for series connection of filter holders so as to enable series-connected filter holders to rotate relative to one another.

4. The filter holder according to claim 1 wherein a first one of said plates which is closest to said holder body has an inner edge in the form of a circle from which an upper portion is removed, said first plate having a circular arcuate edge corresponding to an approximately three-quarter circular circumference; a plurality of projections being formed on a surface of said first plate in a vicinity of said inner edge; an outermost plate which is farther from said holder body than said first plate having an arcuate portion from which a lower front portion is removed and linear portions extending upwardly from an upper end of said arcuate portion, said arcuate portion of said outermost plate being engageable with an outer flange of a cylindrical portion of a like holder; and annular concave grooves engageable with said projections of the first plate being provided at a rear surface of said cylindrical portion so that said filter holder rotatably engages said like holder in series connection.

5. The filter holder according to claim 1 wherein said side walls have a shouldered portion in said first groove, a total width of the said first groove being greater than a total width of said second groove, said first groove being shaped to receive either a filter or filter mount.

* * * * *